United States Patent
Dry et al.

(10) Patent No.: US 7,044,533 B2
(45) Date of Patent: May 16, 2006

(54) WRAPPED BOLSTER SEAL

(75) Inventors: Alan Dry, Grosse Pointe Woods, MI (US); Salvatore DeAngelo, Shelby Township, MI (US); Dave Dooley, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/771,767

(22) Filed: Feb. 4, 2004

(65) Prior Publication Data

US 2005/0168009 A1 Aug. 4, 2005

(51) Int. Cl.
*B60J 5/02* (2006.01)
(52) U.S. Cl. .............. 296/146.5; 296/146.7; 296/146.1; 49/502
(58) Field of Classification Search ............. 296/146.5, 296/154; 49/502
See application file for complete search history.

(56) References Cited

U.S. PATENT DOCUMENTS

| | | | | |
|---|---|---|---|---|
| 3,778,101 A | * | 12/1973 | Tsuda | 396/154 |
| 4,888,919 A | * | 12/1989 | Strosberg et al. | 49/502 |
| 5,419,606 A | | 5/1995 | Hull et al. | |
| 5,456,513 A | | 10/1995 | Schmidt | |
| 5,482,343 A | * | 1/1996 | Bradac | 296/39.1 |
| 5,987,821 A | * | 11/1999 | Heim et al. | 49/502 |
| 6,197,403 B1 | | 3/2001 | Brown et al. | |
| 6,409,250 B1 | | 6/2002 | Schultheiss | |
| 6,412,852 B1 | | 7/2002 | Koa et al. | |
| 6,422,640 B1 | | 7/2002 | Whitehead et al. | |
| 6,626,482 B1 | * | 9/2003 | Barr et al. | 296/146.7 |
| 6,676,195 B1 | * | 1/2004 | Marriott et al. | 296/146.7 |
| 6,725,606 B1 | * | 4/2004 | Nishikawa et al. | 49/502 |
| 6,823,628 B1 | * | 11/2004 | Morrison et al. | 49/502 |
| 2001/0030444 A1 | | 10/2001 | Whitehead et al. | |
| 2002/0180236 A1 | * | 12/2002 | Blomeling et al. | 296/146.5 |
| 2003/0001408 A1 | | 1/2003 | Hockenberry et al. | |

* cited by examiner

*Primary Examiner*—D. Glenn Dayoan
*Assistant Examiner*—Greg Blankenship
(74) *Attorney, Agent, or Firm*—Bill Panagos

(57) ABSTRACT

This wrapped bolster seal comprises at least two door panels, where one is a wet side door panel and another is a dry side door panel disposed opposite the wet side door panel; at least one rib extending from the side of the wet side door panel disposed proximate the dry side door panel; and at least one edge layer wrapped about a top edge of the wet side door panel and extending at least partially along the side of the wet side door panel disposed proximate the dry side door panel. When the wet side door panel and dry side door panel are joined, the rib creates a seal disposed between the wet side door panel and the dry side door panel adapted to reduce moisture from contacting the edge wrapped layer.

5 Claims, 1 Drawing Sheet

WRAPPED BOLSTER SEAL

FIELD OF THE INVENTION

This invention relates to a seal inside of a door for a motor vehicle. More specifically, it relates to a wrapped seal for a wet door.

BACKGROUND OF THE INVENTION

Most motor vehicle doors are a compilation of parts. Typically, the doors have two or more panels, which attach to a doorframe. There can be an exterior panel which protects an occupant from most outside elements and there can be an interior panel, which may add to the luxury of a particular motor vehicle. The interior panel may house such features as an armrest, door locks, window control, etc. However, between the panels there can be some empty space, which may cause problems for a user.

If not properly sealed, the door may suffer damage from leaks that may occur in the empty space. This can cause increased wear and tear on a motor vehicle as well as rusting or other damage due to water retention, not to mention the possibility of a user getting wet while in the motor vehicle. As a result, motor vehicle doors now have seals to protect the door and its panels from water damage. Optimally, a seal will prevent all water from leaking into a door panel. However, it is always possible that some water will leak in. To prevent this problem, some doors, known as wet doors, have a seal in the empty space between the door panels that will also prevent water from reaching the interior of the motor vehicle.

The wet side of the wet door is the side closest to the exterior of the motor vehicle. The dry side is up against the interior of the motor vehicle. The wet and dry sides are joined by a mating part. In a wet door, all holes must be closed and sealed by the mating part. However, in current art, with wrapped parts there is a problem of sealing properly against a random, creased, and layered surface. With these types of surfaces, it is difficult to get an adequate seal that will not have some leakage. This invention solves that problem by creating a seal that keeps the wrapped parts dry.

SUMMARY OF THE INVENTION

The objects of this invention relate to a wrapped bolster seal. This wrapped bolster seal comprises at least two door panels, where one is a wet side door panel and another is a dry side door panel disposed opposite the wet side door panel, at least one rib extending from the side of the wet side door panel disposed proximate the dry side door panel, and at least one edge layer wrapped about a top edge of the wet side door panel and extending at least partially along the side of the wet side door panel disposed proximate the dry side door panel. The rib extends from the wet side door panel farther than the thickness of the edge wrapped layer. The wet side door panel and dry side door panel are joined together. Once the door panels are joined, the rib creates a seal disposed between the wet side door panel and the dry side door panel adapted to reduce moisture from contacting the wrapped layer and keep the edge wrapped layer dry and prevent damage from leaks.

This wrapped bolster seal comprises at least two door panels, where one is a wet side door panel and another is a dry side door panel disposed opposite the wet side door panel, at least one rib extending from the side of the wet side door panel disposed proximate the dry side door panel, at least one edge layer wrapped about a top edge of the wet side door panel and extending at least partially along the side of the wet side door panel disposed proximate the dry side door panel, and a foam-like material extending from the dry side door panel. The rib extends from the wet side door panel farther than the thickness of the edge wrapped layer. The wet side door panel is to be joined to the dry side door panel. After the door panels are joined, the rib is embedded within the foam-like material so as to creates a seal with the foam-like material disposed between the wet side door panel and the dry side door panel and adapted to reduce moisture from contacting the edge wrapped layer to keep the edge wrapped layer dry and prevent damage from leaks.

DETAILED DESCRIPTION OF THE DRAWINGS

DETAILED DESCRIPTION OF THE PREFERRED EMBODIMENT

Figure 4:
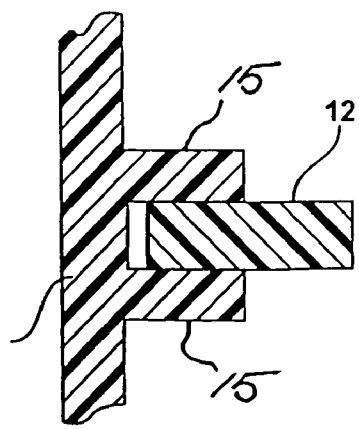
FIG. 4 is a view of the rib creating a seal without the foam-like material.

This invention relates to a wrapped bolster seal for a motor vehicle. In one of the preferred embodiments, seen in FIG. 4, the wrapped bolster seal comprises at least two door panels, where one is a wet side door panel 8 and another is a dry side door panel 10 disposed opposite the wet side door panel 8; at least one rib 12 extending from the side of the wet side door panel 8 disposed proximate the dry side door panel 10; and at least one edge layer 14 wrapped about a top edge of the wet side door panel and extending at least partially along the side of the wet side door panel 8 disposed proximate the dry side door panel 10. The rib 12 is placed beneath the edge wrapped layer 14. Preferably, the rib 12 extends from the wet side door panel 8 farther than the thickness of the edge wrapped layer 14.

The wet side door panel 8 is then to be joined with the dry side door panel 10. The rib 12 creates a seal disposed between the dry side door panel 10 and the wet side door panel 8 adapted to reduce moisture from contacting the edge wrapped layer 14. The seal will be achieved away from the edge wrapped layer 14 so that the edge wrapped layer 14 will always be dry. The wrapped bolster seal further comprises a pair of extended members 15 extending from the dry side door panel 10 opposite the rib 12, and the rib 12 is embedded between the pair of extended members 15 so as to create the seal.

Figure 1:
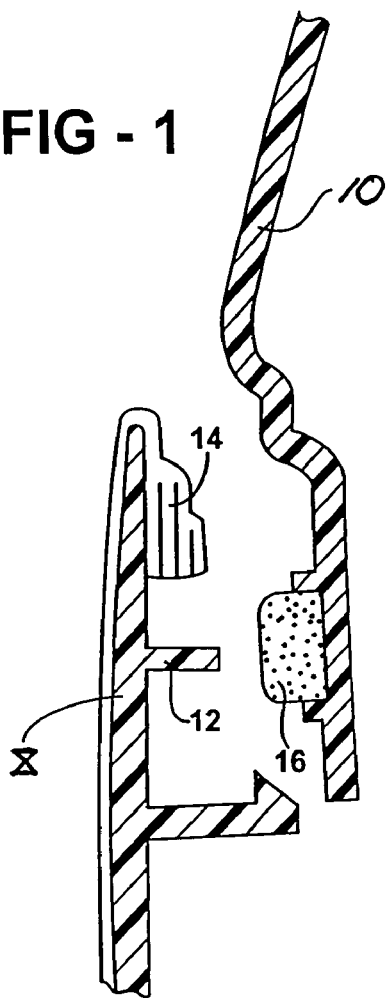
FIG. 1 is a view of the wet side door panel and the dry side door panel before the two door panels are joined.
Figure 2:
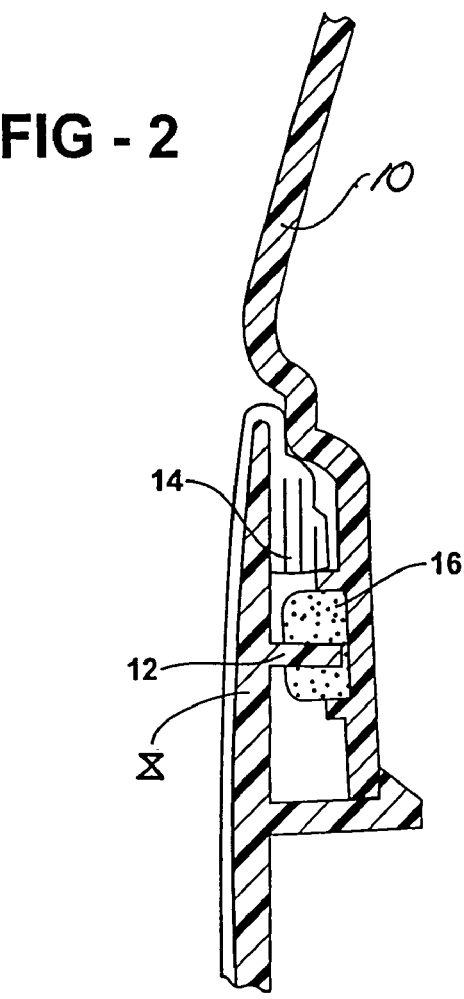
FIG. 2 is a view of the wet side door panel joined with the dry side door panel with the rib creating a seal with the foam-like material.
Figure 3:
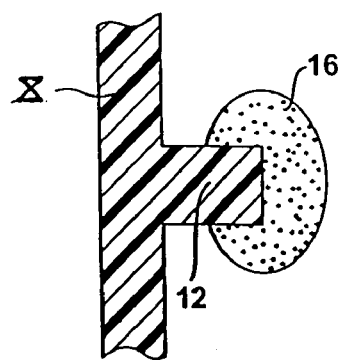
FIG. 3 is a detailed view of the rib creating a seal with the foam-like material.

In another of the preferred embodiments, seen in FIGS. 1–3, the wrapped bolster seal comprises at least two door panels, where one is a wet side door panel 8 and another is a dry side door panel 10 disposed opposite the wet side door panel 8; at least one rib 12 extending from the side of the wet side door panel 8 disposed proximate the dry side door panel 10; at least one edge layer 14 wrapped about a top edge of the wet side door panel 8 and extending at least partially along the side of the wet side door panel 8 disposed proximate the dry side door panel 10; and a foam-like material 16 extending from the dry side door panel 10. Preferably, as in the above-mentioned embodiment, the rib 12 extends from the wet side door panel 8 farther than the thickness of the wrapped layer 14. The foam-like material 16 can comprise any suitable or compliant surface for forming a proper seal.

The wet side door panel 8 is to be joined with the dry side door panel 10, thereby creating the door for the motor vehicle. When the door panels 8, 10 are assembled, the rib 12 is embedded within the foam-like material 16 so as to create a seal with the foam-like material 16 disposed between the wet side door panel 8 and the dry side door panel 10 and adapted to reduce moisture from contacting the edge wrapped layer 14 to keep the edge wrapped layer 14 dry and prevent damage from leaks. This seal will be achieved away from the edge wrapped layer 14 so that the edge wrapped layer 14 will always be dry.

The rib 12 can be placed in nearly any position in relation to the foam-like material 16 and still create a seal. As seen in FIG. 2 and FIG. 3, the rib 12 fits directly into the foam-like material 16. This creates enough of a seal to properly keep the edge wrapping layers 14 dry. With the edge wrapping layers 14 dry, the empty space between the door panels 8, 10 is kept from damage by water.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A wrapped bolster seal for a door of a motor vehicle comprising:
   at least two door panels, one of which being a wet side door panel and another of which being a dry side door panel disposed opposite said wet side door panel;
   at least one rib extending from a side of said wet side door panel disposed proximate said dry side door panel; and
   at least one edge layer wrapped about a top edge of said wet side door panel and extending at least partially along the side of said wet side door panel disposed proximate said dry side door panel;
   wherein said at least one rib creates a seal between said wet side door panel and said dry side door panel, said seal adapted to reduce moisture from contacting said at least one edge wrapped layer.

2. The wrapped bolster seal as set forth in claim 1, wherein said at least one rib extends from said wet side door panel farther than the thickness of said at least one edge wrapped layer.

3. The wrapped bolster seal as set forth in claim 1, wherein said wrapped bolster seal further comprises a pair of extended members extending from said dry side door panel opposite said at least one rib and said at least one rib is embedded between said pair of extended members so as to create said seal.

4. A wrapped bolster seal for a door of a motor vehicle comprising:
   at least two door panels, one of which being a wet side door panel and another of which being a dry side door panel disposed opposite said wet side door panel;
   at least one rib extending from a side of said wet side door panel disposed proximate said dry side door panel;
   at least one edge layer wrapped about a top edge of said wet side door panel and extending at least partially along the side of said wet side door panel disposed proximate said dry side door panel; and
   a foam-like material extending from said dry side door panel;
   wherein said at least one rib is embedded within said foam-like material so as to create a seal between said wet side door panel and said dry side door panel, said seal adapted to reduce moisture from contacting said at least one edge wrapped layer.

5. The wrapped bolster seal as set forth in claim 4, wherein said at least one rib extends from said dry side door panel farther than the thickness of said at least one edge wrapped layer.

\* \* \* \* \*